(12) United States Patent
King et al.

(10) Patent No.: US 10,676,064 B2
(45) Date of Patent: Jun. 9, 2020

(54) IGNITION LOCK ASSEMBLY

(71) Applicant: STEERING SOLUTIONS IP HOLDING CORPORATION, Saginaw, MI (US)

(72) Inventors: Todd M. King, Saginaw, MI (US); Christopher F. Watz, Bay City, MI (US); Thomas M. Finney, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/533,449

(22) Filed: Aug. 6, 2019

(65) Prior Publication Data

US 2019/0359170 A1  Nov. 28, 2019

Related U.S. Application Data

(62) Division of application No. 15/197,946, filed on Jun. 30, 2016, now Pat. No. 10,434,984.

(60) Provisional application No. 62/316,052, filed on Mar. 31, 2016.

(51) Int. Cl.
| | | |
|---|---|---|
| *B60R 25/023* | (2013.01) | |
| *B60R 25/021* | (2013.01) | |

(52) U.S. Cl.
CPC ...... *B60R 25/023* (2013.01); *B60R 25/02147* (2013.01)

(58) Field of Classification Search
CPC .. B60R 25/023; B60R 25/02147; H01H 27/06
USPC ......... 70/182–186, 252, 360, 361, 188–190, 70/379 R, 379 A, 380; 200/43.01, 43.08, 200/43.11, 43.13
See application file for complete search history.

(56) References Cited

U.S. PATENT DOCUMENTS

| | | | | |
|---|---|---|---|---|
| 1,424,353 A | * | 8/1922 | Grey | ................. B60R 25/02147 70/210 |
| 1,603,532 A | * | 10/1926 | Ganz | ................. B60R 25/02147 70/210 |
| 1,674,513 A | | 6/1928 | Jacobi | |
| 3,744,283 A | | 7/1973 | Schmidt | |
| 3,863,475 A | | 2/1975 | Foss | |
| 3,921,422 A | | 11/1975 | Walters | |
| 4,009,599 A | | 3/1977 | Patriquin | |
| 4,052,870 A | | 10/1977 | Degeye et al. | |
| 4,099,395 A | | 7/1978 | Garza | |

(Continued)

FOREIGN PATENT DOCUMENTS

| | | |
|---|---|---|
| CN | 202134411 U | 2/2012 |
| CN | 203351484 U | 12/2013 |

(Continued)

*Primary Examiner* — Lloyd A Gall
(74) *Attorney, Agent, or Firm* — Dickinson Wright PLLC (57) ABSTRACT

An ignition lock assembly includes a lock housing and an ignition lock actuator assembly. The lock housing has a first portion and a second portion that extends from the first portion along an axis. The ignition lock actuator assembly is received within the second portion. The ignition lock actuator assembly includes an actuator gear and a lock cylinder drive disk. The lock cylinder drive disk is at least partially received within the actuator gear. The lock cylinder drive disk has a drive disk body that extends between a first disk end and a second disk end. The first disk end has an inhibit feature.

18 Claims, 8 Drawing Sheets

(56) References Cited

U.S. PATENT DOCUMENTS

| | | | |
|---|---|---|---|
| 4,369,642 A * | 1/1983 | Grell | E05B 11/00 70/380 |
| 4,516,415 A | 5/1985 | Kobayashi | |
| 4,724,722 A | 2/1988 | Beauch | |
| 5,076,080 A | 12/1991 | Fuss | |
| 5,092,147 A | 3/1992 | Mochida et al. | |
| 5,172,576 A | 12/1992 | Milton | |
| 5,263,348 A * | 11/1993 | Wittwer | E05B 17/0058 70/223 |
| 5,265,453 A * | 11/1993 | Konii | E05B 17/04 70/360 |
| 5,289,707 A | 3/1994 | Suzuki | |
| 6,021,654 A * | 2/2000 | McCaa | E05B 13/101 292/336.3 |
| 6,098,434 A | 8/2000 | Liou | |
| 6,354,117 B1 | 3/2002 | Canard | |
| 6,826,934 B2 * | 12/2004 | Canard | B60R 25/02131 70/181 |
| 7,299,669 B1 | 11/2007 | Chung et al. | |
| 8,011,215 B2 * | 9/2011 | Flandrinck | E05B 17/0058 70/379 R |
| 8,347,672 B2 * | 1/2013 | Habecke | E05B 17/0058 70/189 |
| 8,756,964 B2 | 6/2014 | Yano et al. | |
| 8,857,231 B2 | 10/2014 | Perrin et al. | |
| 9,816,290 B2 | 11/2017 | Yamaguchi | |
| 10,434,984 B2 * | 10/2019 | King | B60R 25/023 |
| 2004/0012262 A1 | 1/2004 | Uselli | |
| 2016/0298359 A1 | 10/2016 | Kim | |
| 2017/0203718 A1 | 7/2017 | Perrin et al. | |

FOREIGN PATENT DOCUMENTS

| | | |
|---|---|---|
| CN | 203415476 U | 1/2014 |
| CN | 204792530 U | 11/2015 |

* cited by examiner

IGNITION LOCK ASSEMBLY

CROSS-REFERENCES TO RELATED APPLICATIONS

This patent application is a divisional application of U.S. patent application Ser. No. 15/197,946, filed Jun. 30, 2016, now U.S. Pat. No. 10,434,984, issued Oct. 8, 2019, which claims priority to U.S. Provisional Patent Application Ser. No. 62/316,052, filed Mar. 31, 2016, the disclosure of each application incorporated herein by reference in their entireties.

BACKGROUND OF THE INVENTION

A vehicle may include an ignition key cylinder to selectively operate an ignition switch. The ignition key cylinder may rotate between a plurality of positions that correspond to various vehicle states. The ignition key cylinder may rotate away from at least one of the plurality of positions due to unintended rotation of the ignition key cylinder while the vehicle is in motion. The unintended rotation of the ignition key cylinder may happen due to unintended driver contact with the ignition key cylinder or through an impact created by input through the steering system.

SUMMARY OF THE INVENTION

According to an embodiment of the present disclosure, an ignition lock assembly is provided. The ignition lock assembly includes an ignition lock actuator assembly received within a lock housing. The ignition lock actuator assembly includes an actuator gear, a lock cylinder drive disk, and a biasing member. The actuator gear has a base and an annular wall that extends from the base. The base and the annular wall define a cavity. The lock cylinder drive disk is at least partially received within the cavity. The lock cylinder drive disk has a drive disk body that extends between a first disk end and a second disk end along an axis. The first disk end has an inhibit feature configured to selectively engage a stop feature that extends from a keyed cylinder sleeve that is at least partially receive within the lock housing. The keyed cylinder sleeve receives a keyed cylinder movable between a first position and a second position. The biasing member is disposed between the actuator gear and the lock cylinder drive disk. The biasing member is configured to bias the first disk end towards the keyed cylinder sleeve.

According to another embodiment of the present disclosure, an ignition lock assembly is provided. The ignition lock assembly includes a lock housing that has a first portion, a second portion that extends from the first portion along an axis, and a shoulder that inwardly extends from at least one of the first portion and the second portion towards the axis. The shoulder defines a ramped region that is disposed adjacent to a notch that is defined between a first edge and a second edge of the shoulder. The first portion is configured to receive a keyed cylinder having a guide feature that extends radially from the keyed cylinder. The keyed cylinder is movable between a first position and a second position. The guide feature is configured to engage the first edge to inhibit movement of the keyed cylinder from the first portion towards the second position.

According to still yet another embodiment of the present disclosure, a lock cylinder drive disk is provided. The lock cylinder drive disk includes a drive disk body that extends between a first disk end and a second disk end along an axis. The drive disk body defines a first opening that extends from the first disk end towards the second disk end. The drive disk body includes an inhibit feature on the first disk end that is spaced apart from the first opening. The inhibit feature being configured to selectively engage a stop feature that extends from a keyed cylinder sleeve to selectively inhibit movement of the keyed cylinder sleeve between a first position and a second position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
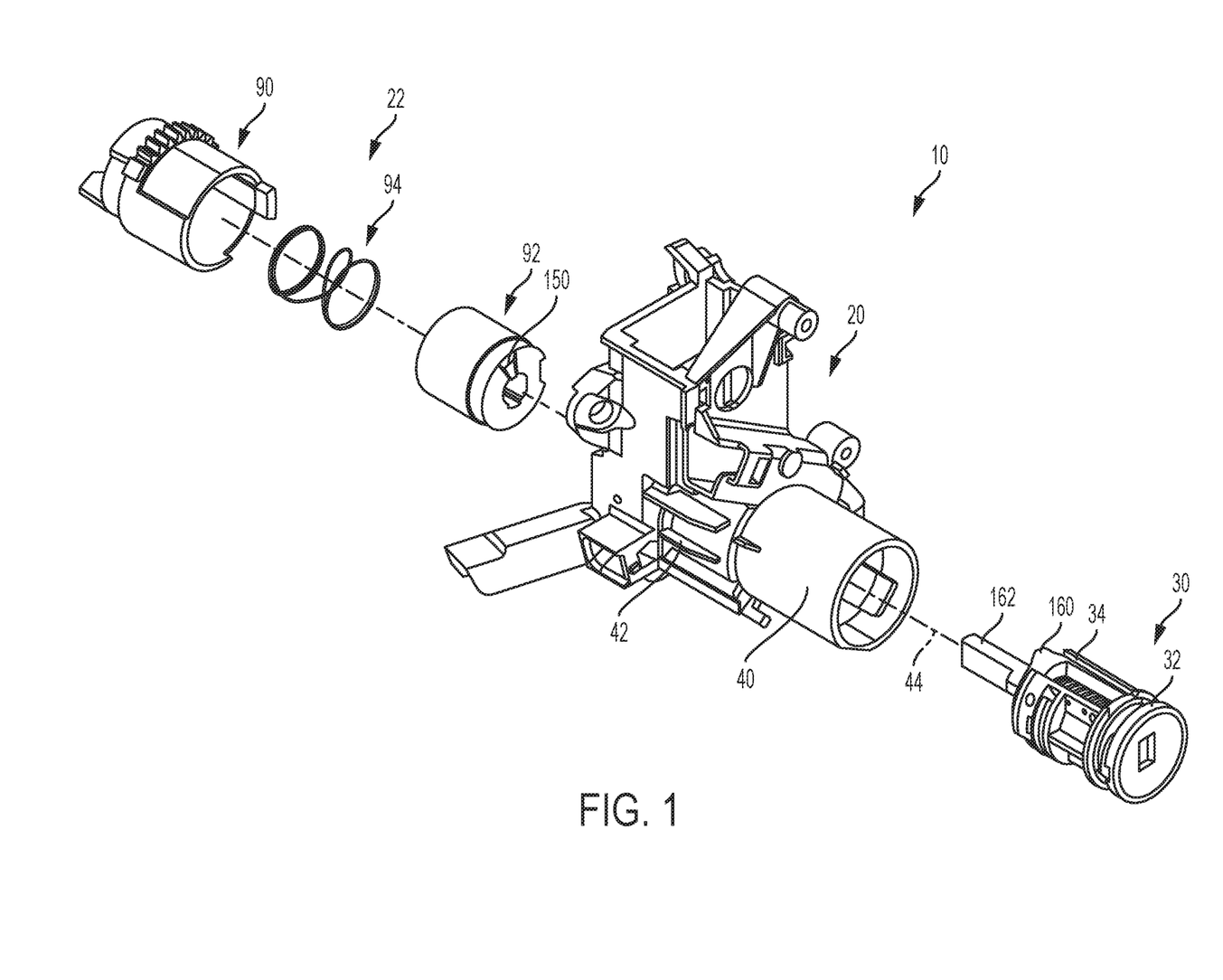
FIG. 1 is a disassembled view of an ignition lock assembly.

Referring to FIG. 1, a vehicle may be provided with an ignition lock assembly 10. The ignition lock assembly 10 may be operatively coupled to a steering column assembly. In at least one embodiment, the ignition lock assembly 10 extends into the steering column assembly.

The ignition lock assembly 10 includes a lock housing 20 and an ignition lock actuator assembly 22. The ignition lock actuator assembly 22 is operatively connected to a vehicle ignition switch and a locking cylinder 30 having a keyed cylinder 32 received within a keyed cylinder sleeve 34.

The ignition lock actuator assembly 22 is configured to selectively actuate the vehicle ignition switch in response to a position of at least one of the keyed cylinder 32 and the keyed cylinder sleeve 34 of the locking cylinder 30. The vehicle ignition switch is configured to selectively control the operational state of the vehicle. The vehicle ignition switch is rotatable or movable between a plurality of positions that correspond to various operational states of the vehicle. A first position of the ignition lock assembly 10 corresponds to a "vehicle run" or a "vehicle on" state. A second position of the ignition lock assembly 10 corresponds to a "vehicle non-run" state, such as a "vehicle accessory on" state, a "vehicle off" state, or the like.

The ignition lock actuator assembly 22 is configured as a push to rotate travel inhibitor configured to inhibit rotation of the keyed cylinder 32 within the keyed cylinder sleeve 34 as part of the locking cylinder 30 from rotating away from the first position towards the second position, while the keyed cylinder 32 within the keyed cylinder sleeve 34 as part of the locking cylinder 30 is in the first position. The ignition lock actuator assembly 22 is configured to enable the keyed cylinder 32 within the keyed cylinder sleeve 34 as part of the locking cylinder 30 to rotate from the first position towards the second position in response to the keyed cylinder 32 within the keyed cylinder sleeve 34 as part of the locking cylinder 30 longitudinally displaced inward towards a centerline of the steering column assembly. The keyed cylinder 32 within the keyed cylinder sleeve 34 as part of the locking cylinder 30 may then be rotated towards the second position.

Figure 2:
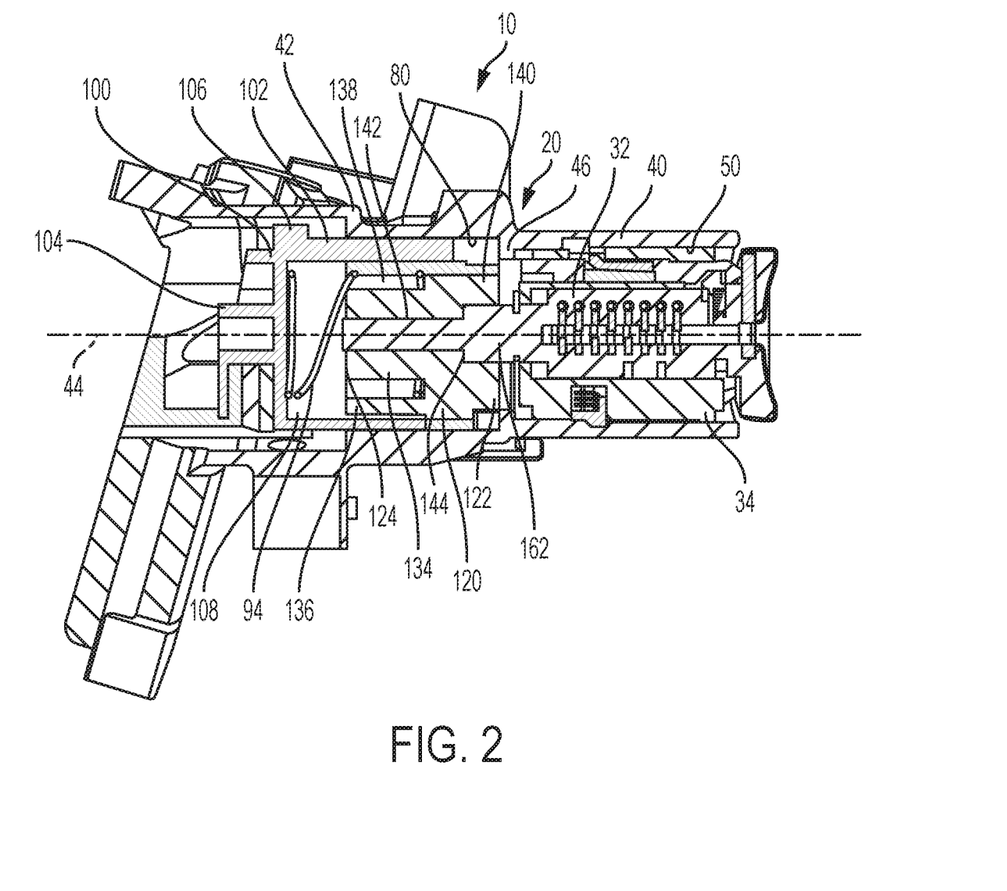
FIG. 2 is a cross-sectional view of the ignition lock assembly.
Figure 3:
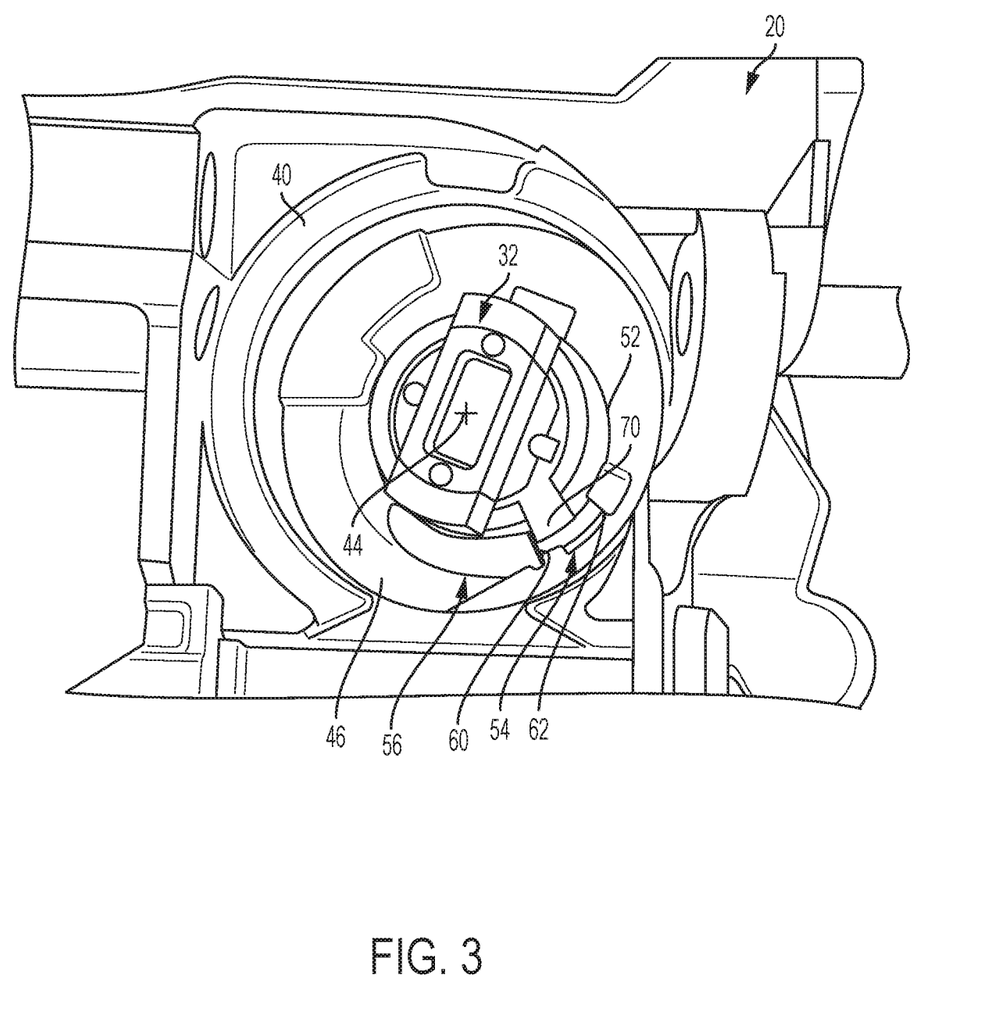
FIG. 3 is an end view of a lock housing of the ignition lock assembly having a keyed cylinder in a first position or run position.

The lock housing 20 is disposed within a steering column assembly. Referring to FIGS. 2 and 3, the lock housing 20 includes a first portion 40 and a second portion 42 extending from the first portion 40 along an axis 44. The lock housing 20 includes a shoulder 46 inwardly extending towards the axis 44. The shoulder 46 may be disposed between the first portion 40 and the second portion 42. In at least one embodiment, the shoulder 46 may be disposed within the first portion 40.

The first portion 40 defines a first bore 50. The first bore 50 has a first diameter. The first bore 50 of the first portion 40 is configured to at least partially receive the locking cylinder 30.

Figure 4:
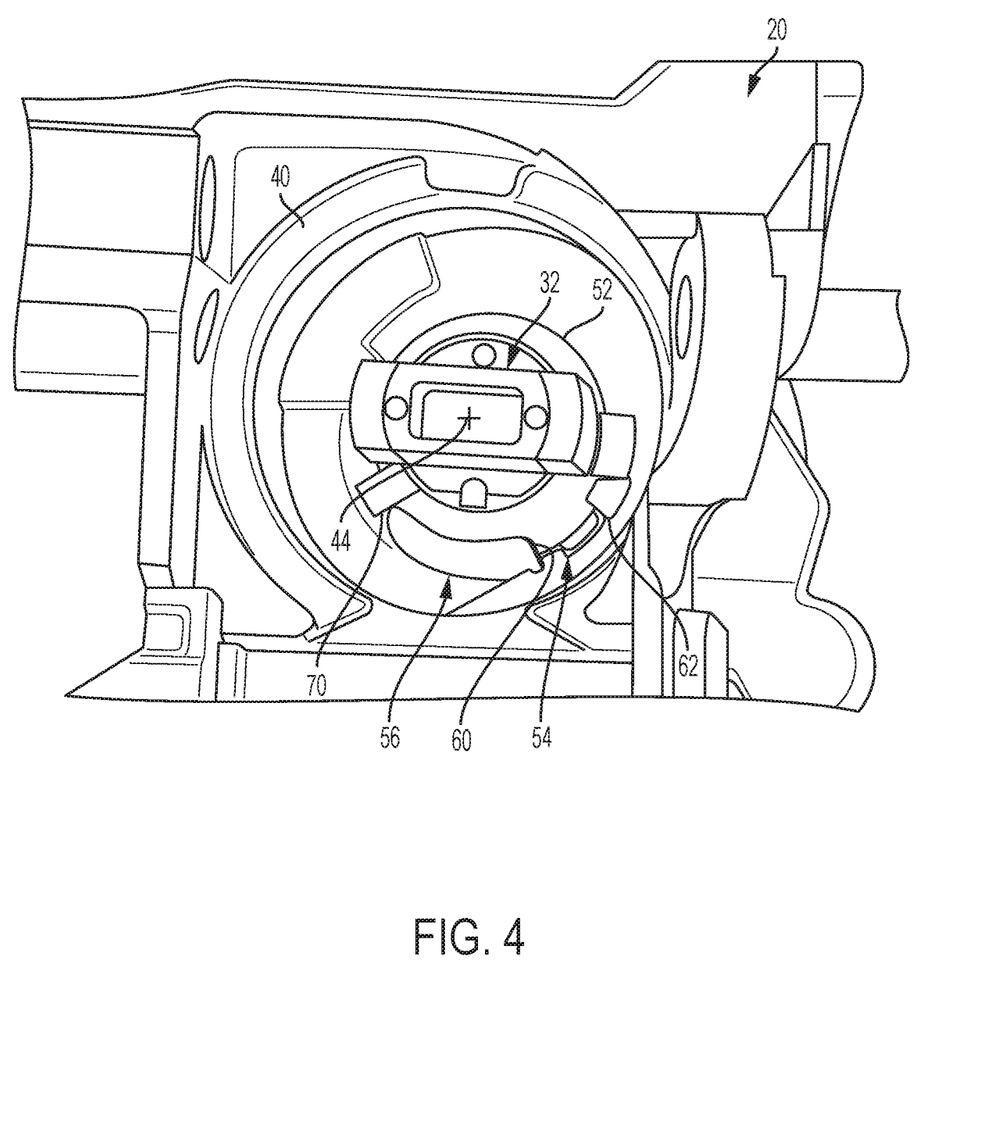
FIG. 4 is an end view of the lock housing of the ignition lock assembly having the keyed cylinder in a second position or non-run position.
Figure 5:
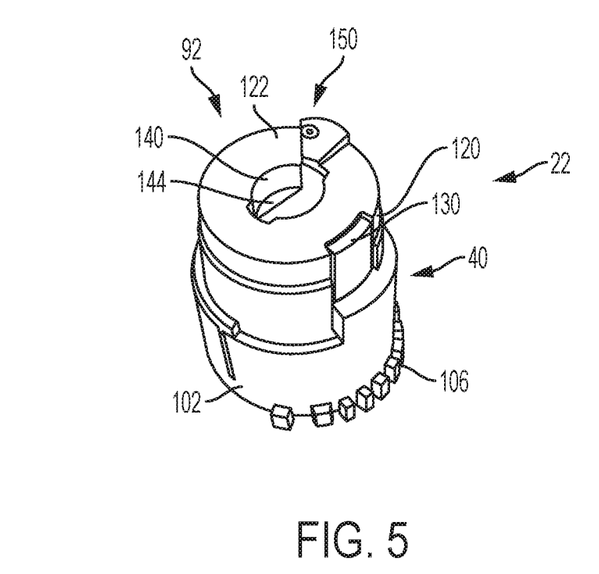
FIG. 5 is a perspective view of an ignition lock actuator assembly of the ignition lock assembly.

Referring to FIGS. 3 and 4, in at least one embodiment a push to rotate travel inhibitor may be directly integrated or formed within the lock housing 20. The shoulder 46 may define a shoulder opening 52, a notch 54, and a ramped region 56. The shoulder opening 52 may be disposed substantially concentrically with the first bore 50. At least a portion of the keyed cylinder 32 extends at least partially through the shoulder opening 52.

The notch 54 may extend outwardly from the shoulder opening 52 towards an inner surface of the first portion 40. The notch 54 is defined between a first edge 60 and a second edge 62 of the shoulder 46.

The ramped region 56 extends from the shoulder 46 away from the first portion 40 towards the second portion 42. The ramped region 56 is disposed substantially parallel to the axis 44. The ramped region 56 has an increasing height as the ramped region 56 becomes progressively closer to the first edge 60. An edge of the ramped region 56 is configured as an extension of the first edge 60.

The notch 54 and the ramped region 56 is configured to interface with a guide feature 70 extending radially from the keyed cylinder 32 of the locking cylinder 30 towards an inner surface of the lock housing 20. The guide feature 70 is configured as a shear lug or a guide pin. The guide feature 70 extends through the notch 54 when the keyed cylinder 32 of the locking cylinder 30 is received within the lock housing 20. Referring to FIG. 3, an end view of the lock housing 20 having the keyed cylinder 32 in the first position or run position is shown. The guide feature 70 engages the first edge 60 while the keyed cylinder 32 of the locking cylinder 30 is in the first position or run position. The engagement between the guide feature 70 and the first edge 60 inhibits the keyed cylinder 32 of the locking cylinder 30 from rotating towards the second position or non-run position.

The longitudinal displacement of the keyed cylinder 32 along the axis 44 towards a centerline of the steering column assembly within the first portion 40 displaces the guide feature 70 of the keyed cylinder 32 beyond the ramped region 56 to enable the keyed cylinder 32 of the locking cylinder 30 to be rotated from the first position towards the second position. Referring to FIG. 4, an end view of the lock housing 20 having the keyed cylinder 32 in the second position or non-run position is shown. The guide feature 70 is configured to ride along a surface of the ramped region 56 away from the first edge 60 to aid the keyed cylinder 32 in rotating from the first position towards the second position. The guide feature 70 of the keyed cylinder 32 is spaced apart from the ramped region 56 and the first edge 60 while the keyed cylinder 32 of the locking cylinder 30 are in the second position or non-run position.

Referring back to FIG. 2, the second portion 42 defines a second bore 80. The second bore 80 has a second diameter that is greater than the first diameter. The second bore 80 of the second portion 42 is configured to at least partially receive the ignition lock actuator assembly 22.

Referring to FIGS. 1, 2, and 5-9, the ignition lock actuator assembly 22 includes an actuator gear 90, a lock cylinder drive disk 92, and a biasing member 94. The actuator gear 90 includes a base 100 and an annular wall 102. The base 100 includes a finger 104 extends away from the locking cylinder 30.

The annular wall 102 extends from the base 100 towards the locking cylinder 30. The annular wall 102 defines a plurality of engagement members 106 that extend radially away from the annular wall 102. The plurality of engagement members 106 extend towards the second bore 80 of the second portion 42 of the lock housing 20. The plurality of engagement members 106 are configured to interface with the vehicle ignition switch and change the operational state of the vehicle based on the position of the keyed cylinder 32 within the keyed cylinder sleeve 34 as part of the locking cylinder 30.

The base 100 and the annular wall 102 define a cavity 108. The cavity 108 is configured to at least partially receive the lock cylinder drive disk 92.

The lock cylinder drive disk 92 is operatively engaged with the actuator gear 90. The lock cylinder drive disk 92 includes a drive disk body 120 ending between a first disk end 122 and a second disk end 124 along the axis 44.

Figure 6:
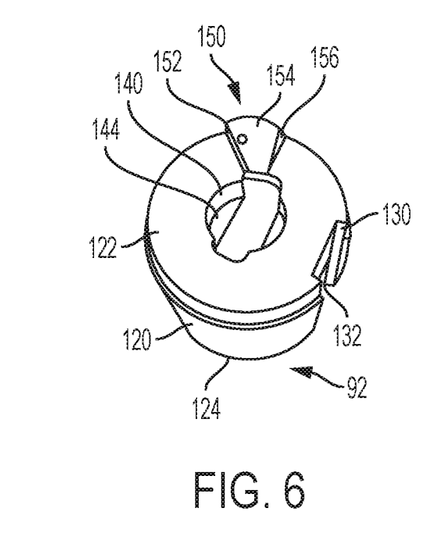
FIG. 6 is a top perspective view of a lock cylinder drive disk of the ignition lock actuator assembly.
Figure 7:
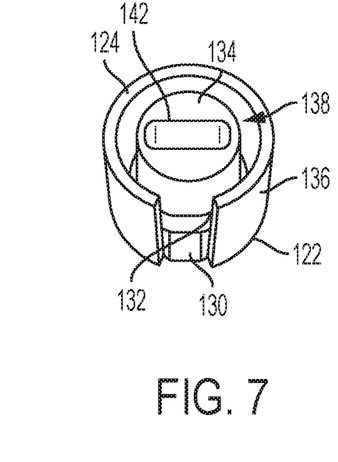
FIG. 7 is a bottom perspective view of the lock cylinder drive disk of the ignition lock actuator assembly.

The drive disk body 120 defines a notched region 130. The notched region extends from the first disk end 122 towards the second disk end 124. The drive disk body 120 further defines a body opening 132. The body opening 132 is disposed substantially co-linear with the notched region 130. The body opening 132 extends from the second disk end 124 towards the first disk end 122. The body opening 132 extends completely through a portion of the drive disk body 120.

The drive disk body 120 includes a central member 134. The central member 134 extends towards the second disk end 124. The central member 134 is configured as a substantially cylindrical protrusion and is spaced apart from a body wall 136. The central member 134 and the body wall 136 defined a disk cavity 138.

The drive disk body 120 defines a first opening 140 and the second opening 142. The first opening 140 extends from the first disk end 122 towards the second disk end 124. The first opening 140 extends at least partially through the central member 134. The second opening 142 extends from the second disk end 124 towards the first disk end 122. The second opening 142 extends at least partially through the central member 134. The first opening 140 is configured as a counter bore of the second opening 142. In at least one embodiment, a shelf 144 is disposed between the first opening 140 and the second opening 142.

The first disk end 122 faces towards the locking cylinder 30 having the keyed cylinder 32 received within the keyed cylinder sleeve 34. The first disk end 122 includes an inhibit feature 150. The inhibit feature 150 extends towards the locking cylinder 30 and is spaced apart from the first opening 140.

The inhibit feature 150 is configured as a protrusion, a ramped region, an inclined region, a declined region, a recessed region, or the like that extends from or extends into the first disk end 122 of the lock cylinder drive disk 92. The inhibit feature 150 includes a first inhibit surface 152, a second inhibit surface 154, and a third inhibit surface 156. The first inhibit surface 152 extends from the first disk end 122 and is disposed substantially parallel to the axis 44. The second inhibit surface 154 extends from an end of the first inhibit surface 152. The second inhibit surface 154 is disposed substantially perpendicular to the first inhibit surface 152 and is disposed substantially perpendicular to the axis 44. The second inhibit surface 154 is configured as a flat. The third inhibit surface 156 extends from an end of the second inhibit surface 154 towards the first disk end 122. The third inhibit surface 156 is configured as a ramped surface that extends between the second inhibit surface 154 and the first disk end 122.

The inhibit feature 150 is configured to selectively co-act, interface, or engage a stop feature 160 extending from a keyed cylinder sleeve end of the keyed cylinder sleeve 34 of the locking cylinder 30. The stop feature 160 extends from a keyed cylinder sleeve end surface of the keyed cylinder sleeve end of the keyed cylinder sleeve 34 as part of the locking cylinder 30 towards the ignition lock actuator assembly 22. The stop feature 160 is spaced apart from an extension member 162 of the keyed cylinder 32 towards and through at least a portion of the ignition lock actuator assembly 22. The extension member 162 extends from a keyed cylinder end of the keyed cylinder 32. The extension member 162 may be integrally formed as part of the keyed cylinder 32 or the extension member 162 may be removably attached to the keyed cylinder 32.

The stop feature 160 is configured as a protrusion, a ramped region, an inclined region, a declined region, or the like that extends from or extends into the keyed cylinder sleeve end of the keyed cylinder sleeve 34. The stop feature 160 includes a first stop surface 170, a second stop surface 172, and a third stop surface 174. The first stop surface 170 extends from the keyed cylinder sleeve end of the keyed cylinder sleeve 34 and is disposed substantially parallel to the axis 44. The second stop surface 172 extends from an end of the first stop surface 170. The second stop surface 172 is disposed substantially perpendicular to the first stop surface 170 and is disposed substantially perpendicular to the axis 44. The third stop surface 174 extends from the second stop surface 172 to the keyed cylinder sleeve end of the keyed cylinder sleeve 34. The third stop surface 174 is configured as a ramped surface that extends between the second stop surface 172 and the keyed cylinder sleeve end of the keyed cylinder sleeve 34.

The biasing member 94 is disposed between the actuator gear 90 and the lock cylinder drive disk 92. The biasing member 94 is received within the cavity 108 and the disk cavity 138. The biasing member 94 engages the base 100 of the actuator gear 90 and a portion of the lock cylinder drive disk 92. The biasing member 94 biases the first disk end 122 of the lock cylinder drive disk 92 towards the keyed cylinder sleeve end of the keyed cylinder sleeve 34 of the locking cylinder 30. The biasing member 94 biases the lock cylinder drive disk 92 towards a locking cylinder 30 such that the first inhibit surface 152 of the inhibit feature 150 of the lock cylinder drive disk 92 engages the first stop surface 170 of the stop feature 160 of the locking cylinder 30.

Figure 8:
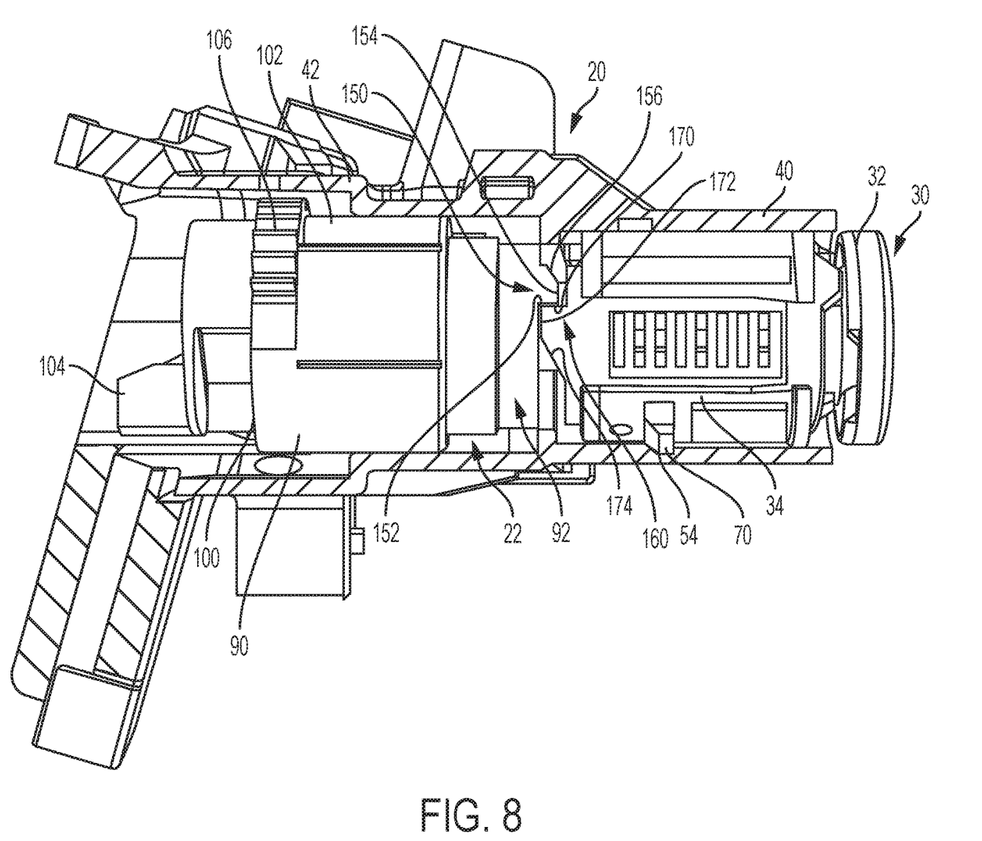
FIG. 8 is a cross-sectional view of the ignition lock assembly in a first position or a run position.

Referring to FIG. 8, the first inhibit surface 152 engages the first stop surface 170 while the keyed cylinder 32 within the keyed cylinder sleeve 34 as part of the locking cylinder 30 are in the first position. The engagement between the first inhibit surface 152 and the first stop surface 170 to inhibit movement of the keyed cylinder 32 within the keyed cylinder sleeve 34 as part of the locking cylinder 30 from the first position towards the second position.

Figure 9:
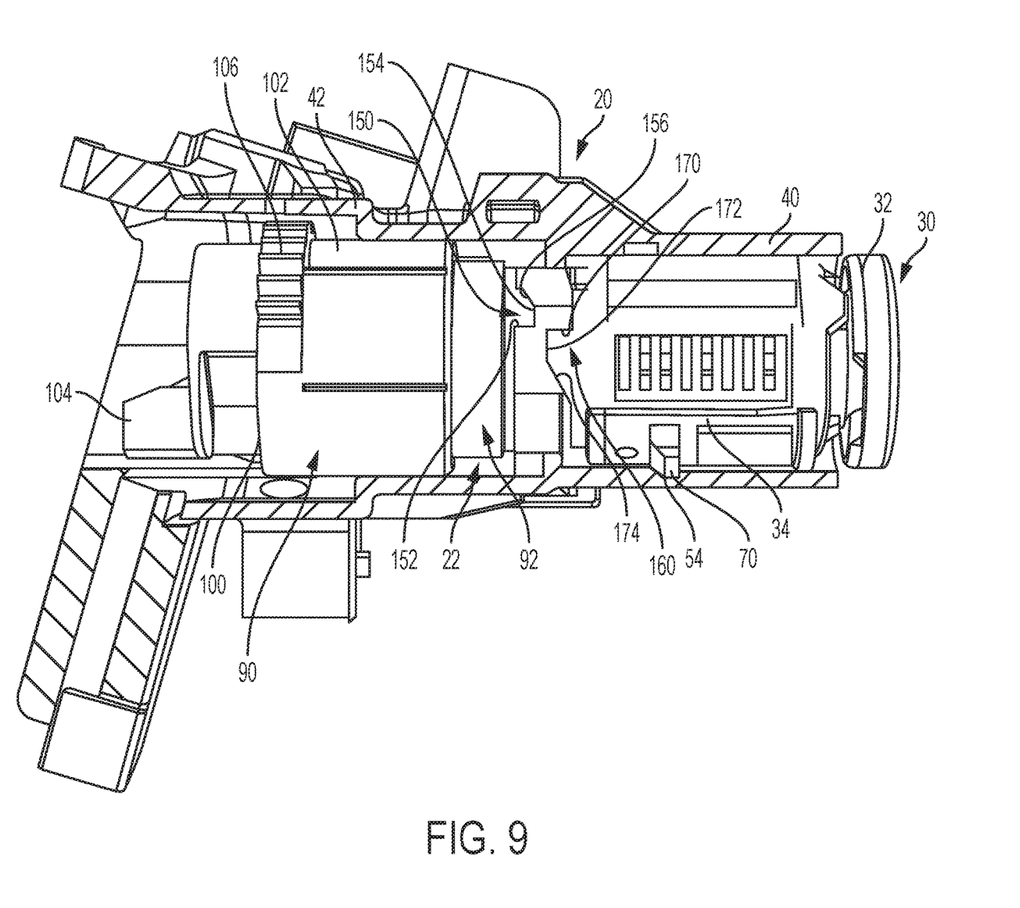
FIG. 9 a cross-sectional view of the ignition lock assembly having an inhibit feature released from engagement with a stop feature.

The extension member 162 of the keyed cylinder 32 within the keyed cylinder sleeve 34 as part of the locking cylinder 30 extends through the first opening 140 and the second opening 142 of the lock cylinder drive disk 92, as shown in FIG. 2. The extension member 162 of the keyed cylinder 32 engages the shelf 144 and is configured to move the second disk end 124 of the lock cylinder drive disk 92 towards the base 100 of the actuator gear 90 and compress the biasing member 94 in response to a longitudinal displacement of the keyed cylinder 32 of the locking cylinder 30 along the axis 44 towards a centerline of the steering column assembly. Referring to FIG. 9, the longitudinal displacement of the keyed cylinder 32 of the locking cylinder 30 releases the first inhibit surface 152 from engagement with the first stop surface 170 and enables the keyed cylinder 32 within the keyed cylinder sleeve 34 as part of the locking cylinder 30 to be moved or rotated from the first position towards the second position.

Figure 10:
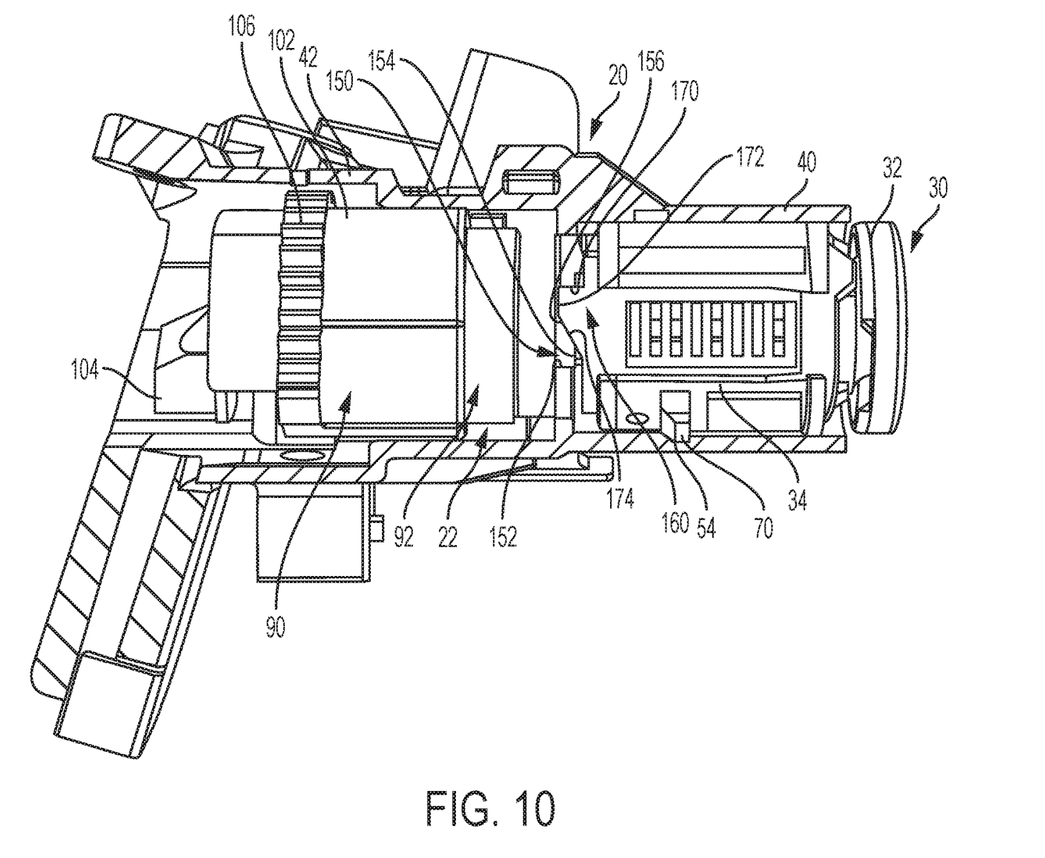
FIG. 10 is a cross-sectional view of the ignition lock assembly in a second position or a non-run position.

Referring to FIG. 10, after rotation of the keyed cylinder 32 within the keyed cylinder sleeve 34 as part of the locking cylinder 30 from the first position towards the second position, the biasing member 94 biases the lock cylinder drive disk 92 towards the locking cylinder 30. The third inhibit surface 156 engages the third stop surface 174 while the keyed cylinder 32 within the keyed cylinder sleeve 34 as part of the locking cylinder 30 are in the second position. The engagement between the third inhibit surface 156 and the third stop surface 174 facilitates or enables the keyed cylinder 32 within the keyed cylinder sleeve 34 as part of the locking cylinder 30 to be rotated from the second position towards the first position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the present disclosure. Additionally, while various embodiments of the invention have been described, it is to be understood that aspects of the invention may include only some of the described embodiments or combinations of the described embodiments. Accordingly, the invention is not to be seen as limited by the foregoing description.

Having thus described the invention, it is claimed:

1. An ignition lock assembly, comprising:
an ignition lock actuator assembly received within a lock housing, the ignition lock actuator assembly, comprising:
an actuator gear having a base and an annular wall extending from the base, the base and the annular wall defining a cavity;
a lock cylinder drive disk at least partially received within the cavity, the lock cylinder drive disk having a drive disk body extending between a first disk end and a second disk end along an axis, the first disk end having an inhibit feature configured to selectively engage a stop feature extending from a keyed cylinder sleeve that is at least partially received within the lock housing having a keyed cylinder movable between a first position and a second position; and
a biasing member disposed between the actuator gear and the lock cylinder drive disk, the biasing member configured to bias the first disk end towards the keyed cylinder sleeve.

2. The ignition lock assembly of claim 1, wherein the inhibit feature includes a first inhibit surface extending from the first disk end, a second inhibit surface extending from an end of the first inhibit surface, and a third inhibit surface extending between the second inhibit surface and the first disk end.

3. The ignition lock assembly of claim 2, wherein the stop feature includes a first stop surface extending from a keyed cylinder sleeve end surface, a second stop surface extending from an end of the first stop surface, and a third stop surface extending between the second stop surface and the keyed cylinder sleeve end surface.

4. The ignition lock assembly of claim 3, wherein the first inhibit surface engages the first stop surface while the keyed cylinder received within the keyed cylinder sleeve is in the first position, to inhibit movement of the keyed cylinder between the first position and the second position.

5. The ignition lock assembly of claim 4, wherein the drive disk body defines a first opening extending from the first disk end towards the second disk end.

6. The ignition lock assembly of claim 5, wherein the drive disk body defines a second opening extending from the second disk end towards the first disk end, the second opening is disposed coaxially with the first opening.

7. The ignition lock assembly of claim 6, wherein the drive disk body includes a shelf disposed between the first opening and the second opening.

8. The ignition lock assembly of claim 7, wherein the keyed cylinder includes an extension member extending through the first opening and the second opening of the drive disk body.

9. The ignition lock assembly of claim 8, wherein in response to a longitudinal displacement of the keyed cylinder along the axis, the extension member moves the second disk end towards the base of the actuator gear to release the first inhibit surface from engagement with the first stop surface and enables the keyed cylinder to be rotated towards the second position.

10. The ignition lock assembly of claim 9, wherein the third inhibit surface engages the third stop surface while the keyed cylinder is in the second position.

11. An ignition lock assembly, comprising:
a lock housing having a first portion and a second portion extending from the first portion along an axis; and
an ignition lock actuator assembly received within the second portion, the ignition lock actuator assembly, comprising:
an actuator gear; and
a lock cylinder drive disk at least partially received within the actuator gear, the lock cylinder drive disk having a drive disk body extending between a first disk end and a second disk end, the first disk end having an inhibit feature.

12. The ignition lock assembly of claim 11, further comprising a biasing member disposed between the actuator gear and the lock cylinder drive disk.

13. The ignition lock assembly of claim 12, wherein the drive disk body defines a first opening extending from the first disk end towards the second disk end.

14. The ignition lock assembly of claim 13, wherein the first disk end faces towards a keyed cylinder rotatably disposed within a keyed cylinder sleeve that is at least partially received within the first portion.

15. The ignition lock assembly of claim 14, wherein the keyed cylinder sleeve includes a stop feature extending from a keyed cylinder sleeve end surface and an extension member spaced apart from the stop feature and extending from a keyed cylinder end.

16. The ignition lock assembly of claim 15, wherein the keyed cylinder is rotatable within the keyed cylinder sleeve about the axis between a first position and a second position and is longitudinally displaceable along the axis.

17. The ignition lock assembly of claim 16, wherein a first inhibit surface of the inhibit feature engages a first stop surface of the stop feature while the keyed cylinder is in the first portion, to inhibit rotation of the keyed cylinder towards the second position.

18. The ignition lock assembly of claim 17, wherein in response to a longitudinal displacement of the keyed cylinder along the axis, the extension member of the keyed cylinder moves the lock cylinder drive disk to compress the biasing member and releases the first inhibit surface of the inhibit feature from engagement with the first stop surface of the stop feature, to enable rotation of the keyed cylinder towards the second position.

* * * * *